United States Patent
Oswald et al.

(10) Patent No.: US 6,247,581 B1
(45) Date of Patent: Jun. 19, 2001

(54) ADJUSTABLE LENGTH CONVEYOR

(75) Inventors: Michael J. Oswald, Kirkwood; Roger T. Foster, Vestal, both of NY (US)

(73) Assignee: Universal Instruments Corporation, Kirkwood, NY (US)

( * ) Notice: Subject to any disclaimer, the term of this patent is extended or adjusted under 35 U.S.C. 154(b) by 0 days.

(21) Appl. No.: 09/429,017

(22) Filed: Oct. 29, 1999

(51) Int. Cl.[7] .................................................. B65G 21/14
(52) U.S. Cl. ..................... 198/812; 198/861.1; 198/817
(58) Field of Search ................................... 198/588, 812, 198/817, 861.1

(56) References Cited

U.S. PATENT DOCUMENTS

| | | | |
|---|---|---|---|
| 2,826,290 | * | 3/1958 | Barski .................................. 198/812 |
| 3,261,450 | * | 7/1966 | McCombie et al. ................. 198/812 |
| 5,649,356 | | 7/1997 | Gieskes ................................. 29/833 |
| 6,012,568 | * | 1/2000 | Kane ............................. 198/861.1 X |

OTHER PUBLICATIONS

5362i Conveyor; System applications.

Applied Conveyor Engineering Edge Guide Conveyor Modules; System Applications; Universal Applied Conveyor Engineering; 1997.

* cited by examiner

*Primary Examiner*—James R. Bidwell
(74) *Attorney, Agent, or Firm*—Burns, Doane, Swecker & Mathis, L.L.P.

(57) ABSTRACT

An adjustable conveyor for conveying a printed circuit board includes a frame, a first track including a first conveyor belt, a second track including a second conveyor belt, wherein the first track and the second track are mounted on the frame so that the first track and the second track are parallel to each other. Each of the first track and the second track includes a first element and a second element that are slidably connected to each other so that a space between the first element and the second element is adjustable so as to change a length of the respective track. Each of the first elements includes a plurality of slide blocks. The slide blocks are slidably mounted on the first elements in an overlapping manner so that an amount of overlap between the slide blocks is adjustable as the space between the first element and the second element is adjusted. The conveyor also includes a device for simultaneously driving the first and second conveyor belts.

24 Claims, 5 Drawing Sheets

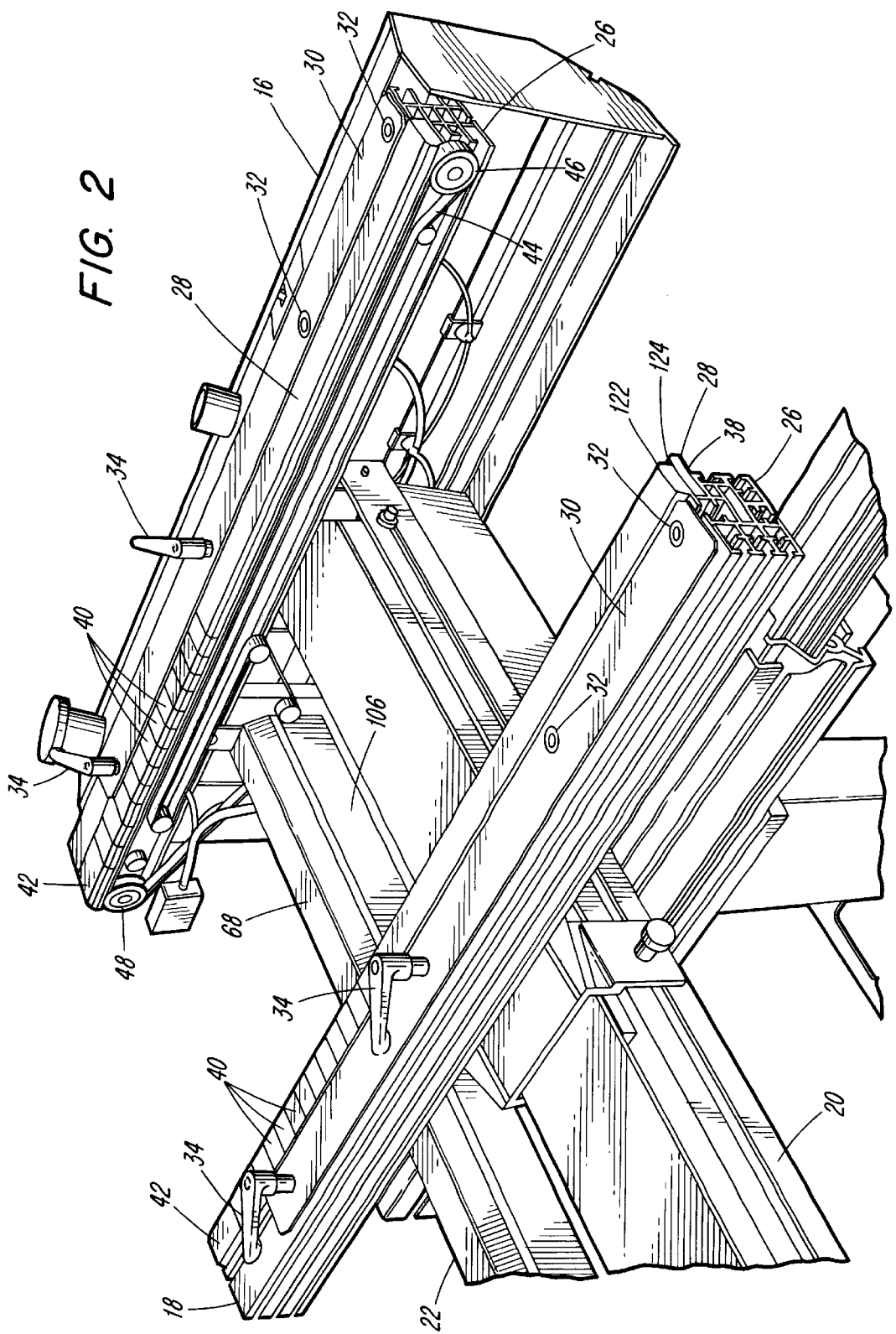

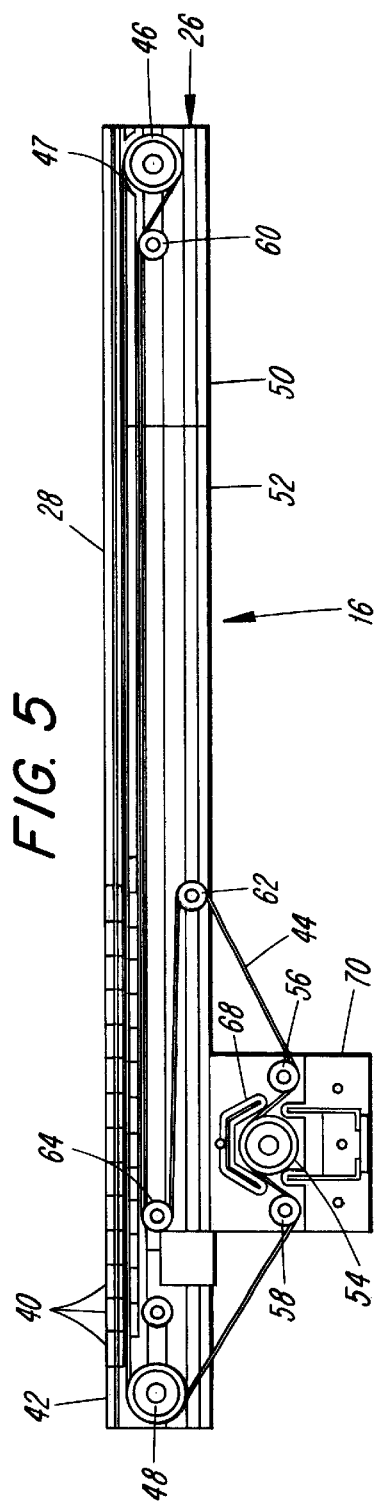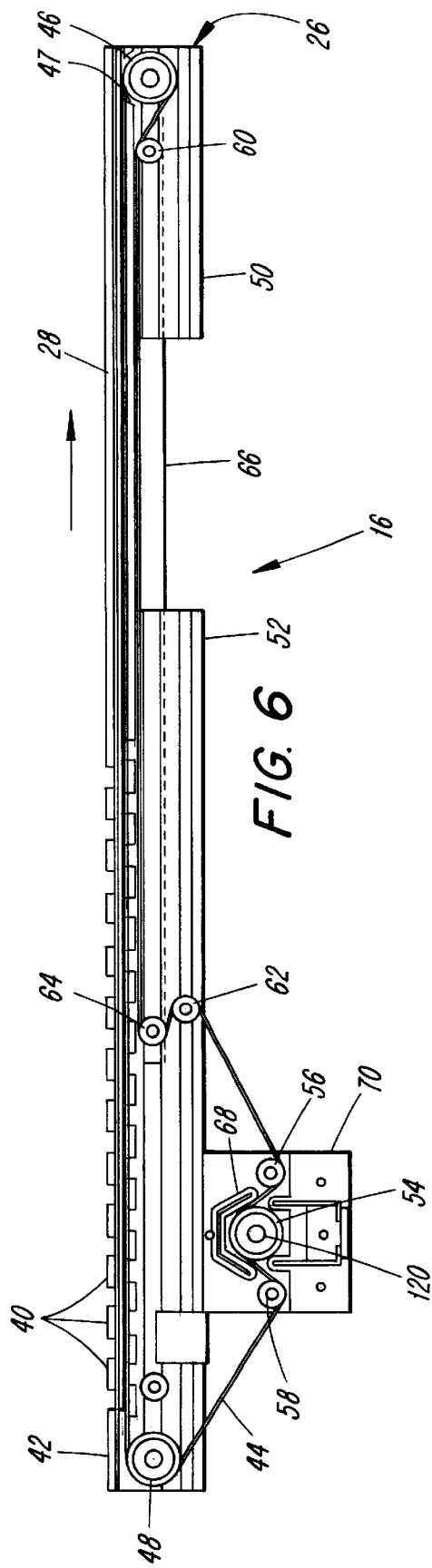

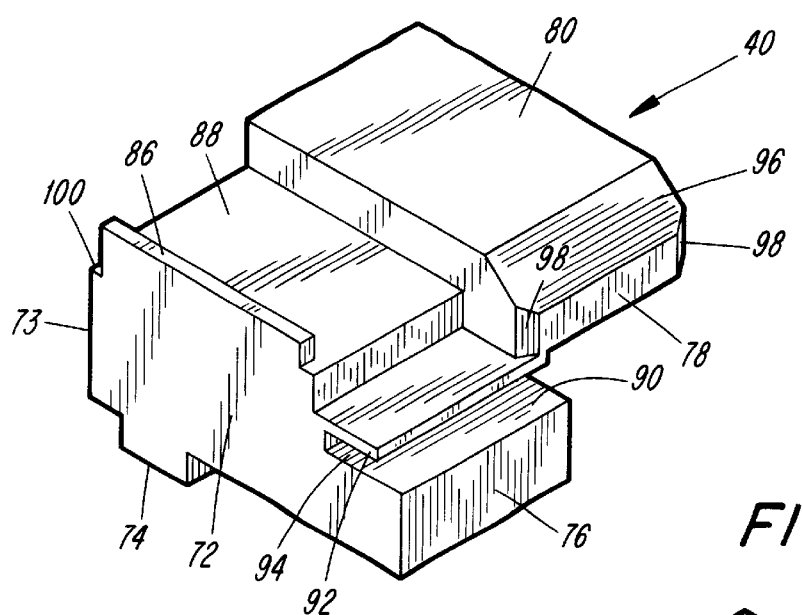
FIG. 7
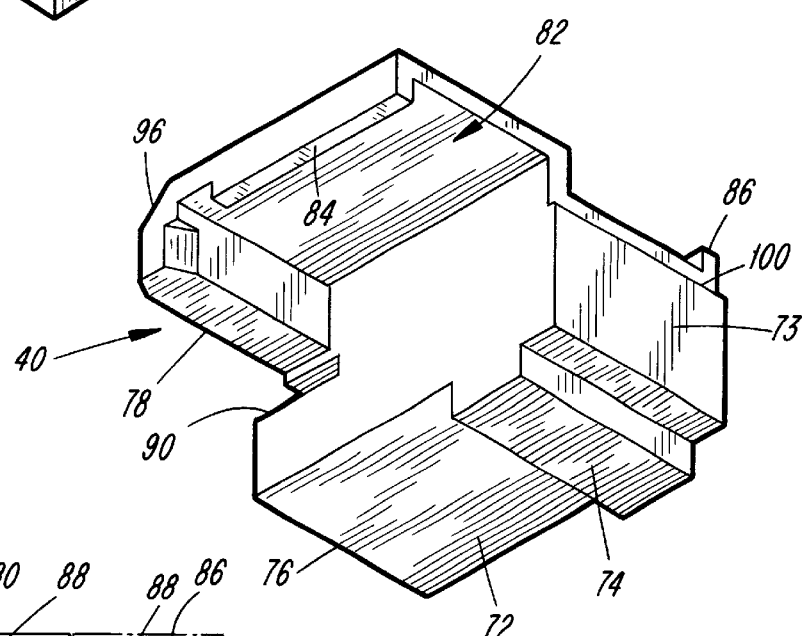
FIG. 8
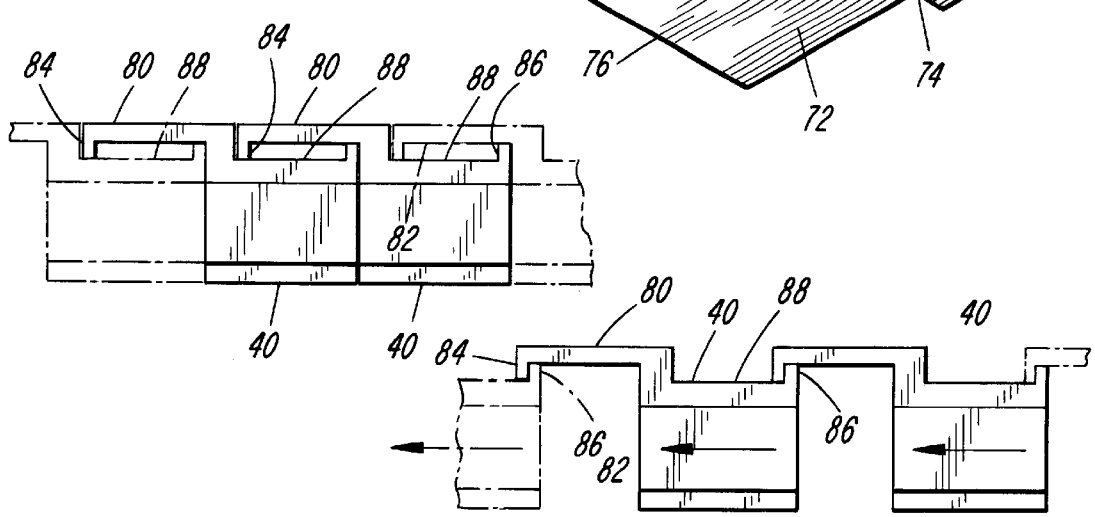
FIG. 9
FIG. 10

ADJUSTABLE LENGTH CONVEYOR

BACKGROUND OF THE INVENTION

1. Field of the Invention

The present invention relates to a conveyor apparatus, and in particular, to an adjustable conveyor apparatus for conveying devices, such as printed circuit boards, wherein the length of the conveying apparatus can be adjusted.

2. Discussion of Related Art

The present invention is designed for, but not limited to, use with machines intended to place components on printed circuit boards. For example, Universal Instruments Corporation makes many different types of apparatus for receiving a printed circuit board, and quickly and automatically placing a number of components on the printed circuit board with high precision. See, e.g., U.S. Pat. No. 5,649,356, among others. However, it has been found that one such machine is not always capable of fully populating a particular printed circuit board. In such a case, it is necessary to transfer the printed circuit board from one machine to another machine so that the second machine may continue populating the board with additional components. Such transfer or conveying machines are referred to as edge guide conveyors.

Traditionally, edge guide conveyor modules have been used to convey the printed circuit boards from one machine to another. See, e.g., the 5362I Conveyor or the 5374 Shuttle Transfer Conveyor manufactured and sold by Universal Instruments Corporation of Binghamton, N.Y. The 5362I conveyor includes a pair of parallel belts each of which is designed to support an edge of a printed circuit board to convey the printed circuit board from one populating machine to another. However, the length of the 5362I Conveyor apparatus is fixed. The 5374 Shuttle Transfer Conveyor has a gate that can be opened to allow an operator to pass between adjacent machines.

If the distance between the two populating machines is changed, it is necessary to substitute a conveyor of a different length. As an alternative to substituting a conveyor of a different length, other systems are known that enable blocks to be added on to the end of the transfer rails to increase their lengths, or that include adjustable rails that allow the belt supports in the PC card guide to slide inside one another. In the latter device, a spring or weight is used to load the conveyor belt in order to maintain a uniform tension on the belt.

However, such methods have not been satisfactory. For example, the use of blocks to expand the length of the transfer rails requires additional parts to be kept with the conveyor, and doesn't necessarily provide for precise adjustment of the length of the transfer rails. In other words, the adjusted length is limited to the size of the blocks. With regard to the conveyor devices with adjustable rails, such adjustable rails that slide inside one another have the disadvantage in that they leave an edged exposed on the card guide which potentially catches an edge of the PC board that is being transported on the conveyor. Furthermore, the spring loaded belts limit the load that can be transferred by the conveyor and increase the load on the transfer motor.

OBJECTS AND SUMMARY

In view of the aforementioned problems with the prior devices, the present invention was conceived to avoid or overcome as many of the aforementioned problems as possible. For example, it is an object of the present invention to provide a conveyor mechanism, the length of which can be easily adjusted.

It is another object of the present invention to provide a conveyor mechanism, the length and width of which can be easily adjusted.

It is yet another object of the present invention to provide an adjustable conveyor mechanism, wherein the length of the conveyor mechanism can be adjusted without having to resort additional or external components or parts.

It is still another object of the present invention to provide an adjustable conveyor mechanism, wherein when the length of the conveyor mechanism is extended, there are a minimum of edges exposed that may potentially catch an edge of an object, such as a PC card, that is being transported on the conveyor mechanism.

According to one preferred embodiment of the present invention, an adjustable conveyor for conveying a printed circuit board includes a frame, a first track including a first conveyor belt, and a second track including a second conveyor belt, wherein the first track and the second track are mounted on the frame so that the first track and the second track are parallel. Each of the first track and the second track includes a first element and a second element that are slidably connected to each other so that a space between the first element and the second element is adjustable so as to change a length of the respective track. And, each track includes a plurality of guides that are slidably mounted in an overlapping manner so that an amount of overlap between the plurality of guides is adjustable as the space between the first element and the second element is adjusted. The conveyor further includes means for simultaneously driving the first and second conveyor belts.

In the adjustable conveyor, each of the first conveyor belt and the second conveyor belt are supported by both a first element and a second element of the respective first and second tracks.

Each of the plurality of guides is a slide block that includes a first overlap element and a second overlap element, wherein the first overlap element of one of the slide blocks engages with the second overlap element of an adjacent one of the slide blocks to limit relative movement between the one of the slide blocks and the adjacent one of the slide blocks.

BRIEF DESCRIPTION OF THE DRAWINGS

FIG. 2 is a view of a portion of the adjustable conveyor mechanism illustrated in FIG. 1.

FIG. 5 is a side view of one of the tracks of the conveyor mechanism of the present invention in a contracted state.

FIG. 6 is a side view of the track illustrated in FIG. 5 in an expanded state.

FIG. 7 is a top perspective view of a slide block used in the present invention.

FIG. 8 is a bottom perspective view of the slide block of FIG. 7.

FIG. 9 is a side view of a plurality of slide blocks in a contracted state.

FIG. 10 is a side view of a plurality of slide blocks in an expanded state.

DETAILED DESCRIPTION OF THE PREFERRED EMBODIMENTS

Figure 1:
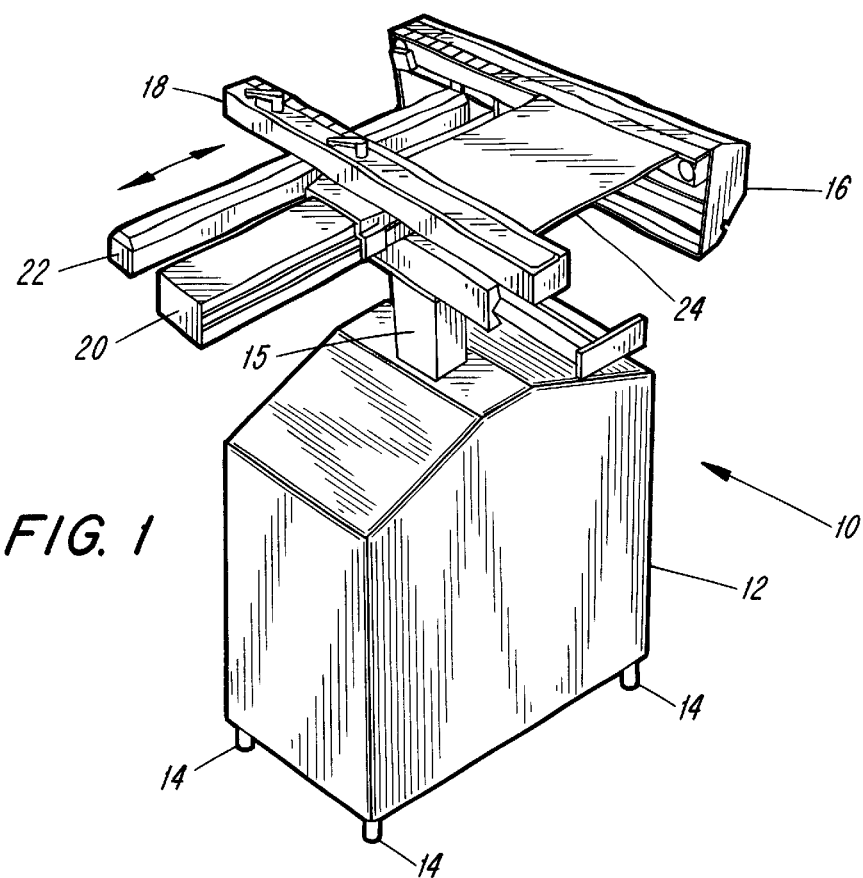
FIG. 1 is a perspective view of an adjustable conveyor mechanism according to the present invention.

FIG. 1 is a perspective view of an adjustable conveyor apparatus 10 according to one preferred embodiment of the present invention.

The conveyor apparatus 10 includes a base 12 mounted on feet 14. The feet 14 may include any type of support element, preferably one that can be adjusted in height. The base 12 includes a control means (not shown) for the conveyor apparatus 10. The apparatus 10 further includes an adjustable pedestal leg 15, the height of which can be adjusted.

Mounted to the pedestal leg 15 is a support 20 for supporting a first track 16 and a second track 18. The first and second tracks 16, 18, are mounted on the support 20 in a parallel manner. Although the second track 18 is preferably fixed to the support 20, the first track 16 may be moved with respect to the support 20 in the direction of arrow A illustrated in FIG. 1 so that the spacing between the first track 16 and the second track 18 can be adjusted to accommodate the specific width of the printed circuit boards 24 being conveyed. Parallel to the support 20 is a housing 22 for a drive shaft.

FIG. 2 is a more detailed view of the first and second tracks 16, 18, together with the support 20 and drive shaft housing 22. FIG. 5 is a side elevational view of the first track 16 in a contracted state, and FIG. 6 is a side elevational view of the first track 16 in an expanded state.

Figure 3:
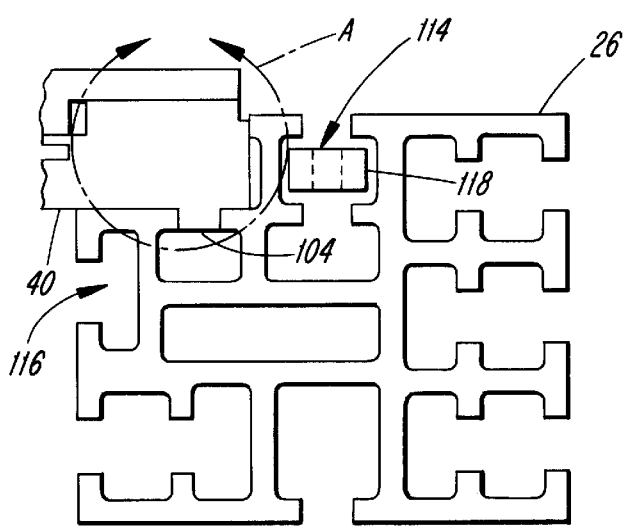
FIG. 3 is an end view of a portion of one of the tracks of the conveyor mechanism.
Figure 4:
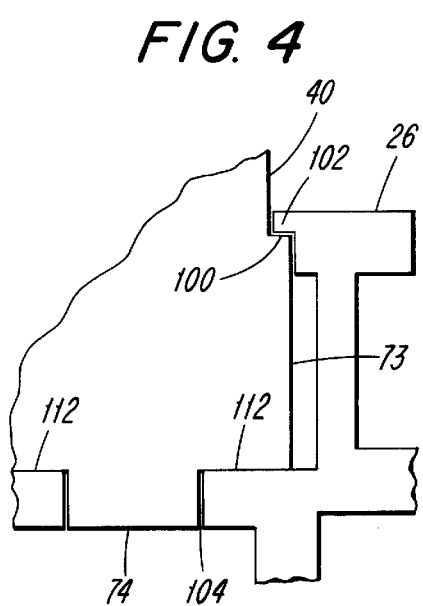
FIG. 4 is an enlargement of the part of FIG. 3 in circle A.

Each of the first and second tracks 16, 18, includes a beam 26 that is actually comprised of a first half or element 50 and a second half or element 52. FIGS. 3 and 4 show end views of the beam 26, and illustrate the contour of the beam 26.

The first element 50 and the second element 52 of the beam 26 are held together by two plates. The first plate 30 is mounted to the top surface of the first element 50 by bolts 32. The first plate 30 is secured to the second element 52 of the beam 26 by bolts 34, which include handles for easy loosening and tightening. The bolts 32, 34 extend into the channel 114 of the beam 26 illustrated in FIG. 3, and engage with nuts 118 which are also located within the channel 114. By tightening the bolts 32 to the nuts 118, the first plate 30 is fixedly secured to the first element 50. When the bolts 34 are secured to their respective nuts 118 in track 114, the second element 52 is also fixed with respect to the first plate 30, and also with respect to the first element 50. However, the spacing between the first element 50 and the second element 52 can be changed by loosening the bolts 34 and sliding the second element 52 away from or towards the first element 50 in the direction of arrow B.

The first element 50 and the second element 52 are also held together by a second plate or bar 66 that extends in track 116 of the beam 26. See FIGS. 3 and 6. The bar 66 is fixedly secured to the first element 50, and is slidably engaged in the track 116 of the second element 52 to enable adjustment of the spacing between the first element 50 and the second element 52.

In a preferred embodiment of the present invention, the first and second elements 50, 52 of the beam 26 are made of aluminum. However, the beam 26 can be made of any other suitable material. The first plate 30 and the bar 66 are also made of aluminum, or any other suitable material.

Each of the first and second tracks 16, 18 includes a conveyor belt 44. The conveyor belt 44 is preferably a thin flexible belt approximately a quarter of an inch wide. The belt 44 is supported at one end by a pulley 46 mounted on the first element 50, and is supported at an opposite end by a pulley 48 mounted on the second element 52. Fixed idler pulleys 56, 58, 60, and 62 are also mounted on the first and second elements 50, 52 to guide the conveyor belt 44. See FIGS. 5 and 6.

An adjustable pulley 64 is mounted on one end of the bar 66 so that the pulley 64 stays in a fixed position relative to the first element 50 when the second element 52 is moved with respect to the first element 50.

A drive pulley 54 is mounted directly below and in driving engagement with the conveyor belt 44. The pulleys 56, 58 facilitate holding the conveyor belt 44 in driving engagement with the drive pulley 54.

Extending through a center portion of the drive pulley 54 is a drive shaft 120. The drive shaft 120 extends perpendicular to the first and second tracks 16, 18 through the housing 22 so that the drive pulley 54 of both the first track 16 and the second track 18 may be mounted onto the drive shaft 120. A motor (not shown) is mounted below the drive shaft 120 and is engaged to the drive shaft 120 by a belt, chain, gear mechanism, or some other suitable drive means. The operation of the motor, including the speed and direction of rotation is controlled by a control unit inside the base 12 of the conveyor apparatus 10. As an alternative to the above-described arrangement, two separate motors may be used instead of a single motor and the drive shaft. The two separate motors may be controlled individually, or preferably, with a feedback loop to ensure that the tracks 16, 18 operate in synchronization with each other.

The control unit can drive the belts 44 at an adjustable speed, and in both forward and reverse directions. In addition, the control unit can be connected to the adjacent populating machines to coordinate operation of the conveyor apparatus with that of the adjacent populating machines.

The motor, drive pulley 54, idler pulleys 56, 58 are supported by a bracket 70 which is fixed to a bottom surface of the second element 52. Because the pulley 64 is fixed to the bar 66 and stays in a fixed relationship to the first element 50 as the second element 52 moves with respect to the first element 50, the tension on the conveyor belt 44 stays substantially uniform when the spacing between the first element 50 and the second element 52 is changed.

A card guide 28 is secured to a top edge of the beam 26. In a preferred embodiment, the card guide 28 includes a lower half 38 which includes a shelf or edge to support an edge of the conveyor belt 44 and an elongated tab that fits in the channel 104 of the beam 26. The card guide 28 also includes a top half 36 that has a beveled edge 122 to help guide the printed circuit board 24 onto the conveyor belts 44.

As illustrated in FIGS. 6 and 7, the lower half 38 of the card guide 28 may include a cut-out 47 to accommodate the conveyor belt as it curves downwardly over the pulley 46.

The card guides 28 may be made from any suitable material, such as UHMW (carbon filled). The card guides 28 may be extruded.

Arranged in alignment with the card guide 28 are a plurality of slide blocks 40. In a preferred embodiment, there are 12 slide blocks 40. However, the actual number of slide blocks can be determined, as needed. FIGS. 7 and 8 illustrate the slide block 40 in detail.

Each slide block 40 includes a base portion 72 that has a first key 74 extending from a bottom portion thereof and a second key 73 extending from a back portion thereof. As can be seen most clearly in FIGS. 3 and 4, the first key 74 is intended to fit in a channel 104 in the beam 26. The second key 73 includes an edge 100 which engages with a edge 102 of the beam 26 so as to retain the slide block 40 within the beam 26. In this manner, the slide block 40 can slide longitudinally along the surface 112 of the beam 26.

The slide block 40 includes a first overlap surface 88 having a first overlap edge 86 extending upwardly from one edge thereof. The slide block 40 further includes a second overlap surface 82 and a second overlap edge 84 extending downwardly from the second overlap surface 82. As illustrated in FIGS. 9 and 10, the slide blocks 40 are nested together so that the overlap surfaces 82, 88 oppose each other, and such that the first overlap edge 86 engages with the second overlap edge 84 when the slide blocks are in a fully expanded position, as illustrated in FIG. 10. As a result of this construction, the slide blocks 40 can easily slide back and forth with respect to each other such that the movement between adjacent slide blocks is limited by the overlap edges 84, 86.

The base 72 of each of the slide blocks includes a front protruding portion 76 that defines a shelf 90. In a preferred embodiment, the shelf 90 extends from the base 72 a distance that is substantially similar to the width of the conveyor belt 44 such that the conveyor belt 44 may be supported on the shelf 90. An overhang portion 92 defines a slot 94 in which a portion of the belt 44 travels. In addition, part of the top portion 80 also hangs over the slot 94. The overhang portion 92 and the top portion 80 are sized such that approximately 3 millimeters of the conveyor belt 44 is exposed in order to support an edge of a printed circuit board 24.

The slide blocks 40 each include a top portion 80 that includes a first beveled surface 96 and second beveled surfaces 98. The first beveled surface 96 helps guide a printed circuit board 24 that is being lowered onto the conveyor belts 44. The second beveled surfaces 98 are intended to minimize the likelihood that a corner of a printed circuit board 24 traveling on the conveyor belts 44 will inadvertently catch or engage with one of the slide blocks 40 while traveling along the conveyor belt 44. A front edge 78 of the top portion 80, together with a front edge 92a of the overhang portion 92, helps guide the printed circuit board 24 as it is conveyed by the conveyor belts 44.

The slide blocks 40 may be made of any suitable material, such as carbon filled delrin. The slide blocks 40 can be injection molded.

Figure 11:
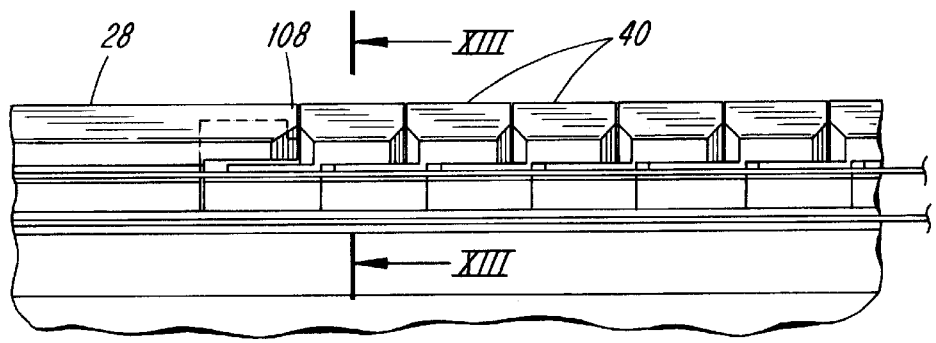
FIG. 11 is a side view of a track of the present invention in a contracted state.
Figure 12:
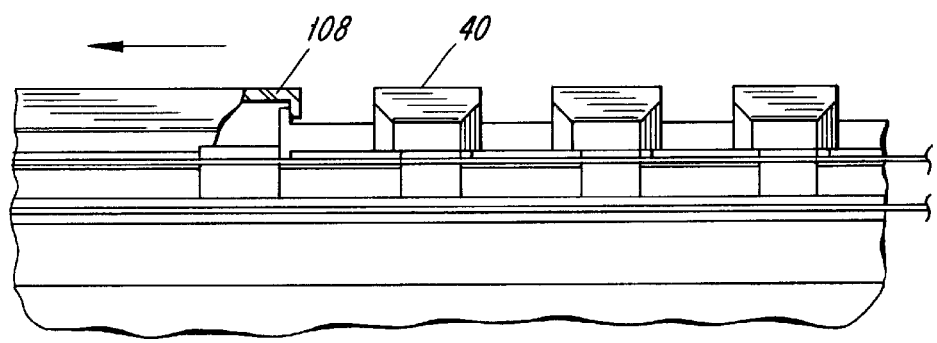
FIG. 12 is a side view of the portion of the track shown in FIG. 11, except in an expanded state.
Figure 13:
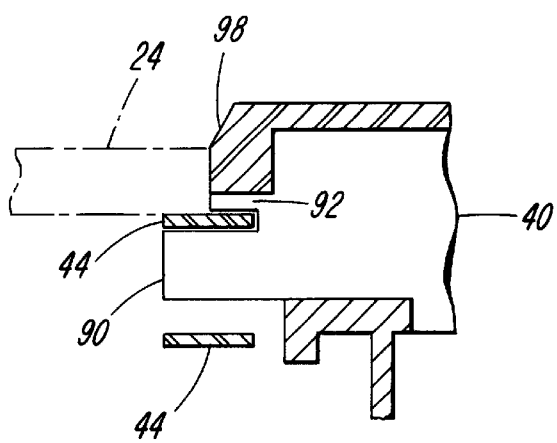
FIG. 13 is a cross sectional view taken along line XIII-XIII in FIG. 11.
Figure 14:
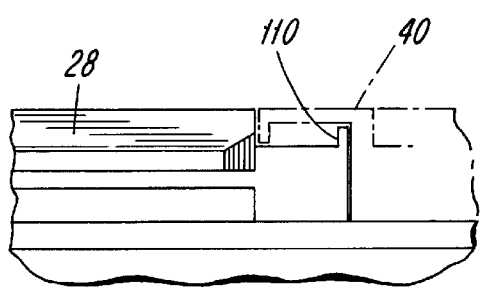
FIG. 14 is a side view of another track of the present invention.

In order to enable the same design of slide blocks 40 to be used on both the first track 16 and the second track 18, the edge of the card guide 28 on the first track 16 is different than the edge of the card guide 28 on the second track 18. Specifically, as can be seen in FIGS. 11 and 12, the edge of one of the card guides 28 includes a downwardly extending edge 108 to engage with the first overlap edge of the adjacent slide block 40. However, as can be seen in FIG. 14, the end of the other card guide 28 includes an upwardly extending edge 110 to engage with the second overlap edge 84 of the adjacent slide block 40.

Each of the slide blocks 40, the card guides 28, and the conveyor belts 44 are preferably made from a static dissipatory material to minimize any build-up of static electricity.

In order to adjust the length of the conveyor mechanism, the bolts 34 on each of the first and second tracks 16, 18 are loosened, and the respective second element 52 of each track 16, 18 is pulled away from the respective first element 50, as illustrated in FIG. 6. As the second element 52 is moved away from the first element 50, the configuration of the slide blocks 40 is changed from the original contracted configuration illustrated in FIGS. 5, 9, and 11 to the expanded configuration illustrated in FIG. 6, 10, and 12. Of course, if the second element 52 is moved only part way from the first element 50, the spacing of the slide blocks may be somewhat closer to each other than is illustrated in FIGS. 6, 10, and 12. Because of the construction of the conveyor assembly of the present invention, the spacing between the first element 50 and the second element 52 (and thus the overall length of the conveyor assembly) can be changed from a fully contracted position, as illustrated in FIG. 5 to a fully expanded position, as illustrated in FIG. 6, or to any position therebetween. Once the first and second elements 50, 52 are set to their desired position, the bolts 34 are tightened to secure the second element 52 to the first plate 30 so that the relative positioning of the first element 50 and the second element 52 is not changed.

An alternative embodiment of the present invention is similar to the embodiment described above, except for the shape of the card guides and the plurality of slide blocks. The second embodiment utilizes an elongated card guide that is preferably made in two separate pieces. A first half of the card guide is fixed to the first element and the second half of the card guide is fixed to the second element, so that the first and second halves of the card guide are in axial alignment with each other. There is no plurality of slide blocks that are shaped like the slide blocks 40 described above. The facing ends of the first and second halves of the card guide are configured so as slide together in an overlapping manner. For example, one end of the card guide may be split in a horizontal manner to form a narrow slot extending axially into the card guide, and the remaining half may have a tapered end that fits within the narrow slot. As the length of the conveyor is adjusted, the extent of overlap of the two halves of the card guide is correspondingly adjusted.

In another embodiment of the present invention, the card guide includes a plurality of slide blocks. However, the blocks are not designed to overlap with each other, as disclosed with regard to the first embodiment. Instead, the respective track includes a path or guideway for the slide blocks that, for a first section, parallels the conveyor belt. At the end of the first section, a second section of the path or guideway curves and extends away from the conveyor belt. In this embodiment, when the track is fully expanded, all of the slide blocks are in the first section of the path or guideway, and are used to guide the conveyor belt and conveyed articles. However, as the track is contracted, a portion of the slide blocks are diverted into the second section of the path so that they are no longer adjacent the conveyor belt and conveyed articles. By diverting a portion of the slide blocks, there is room for the two halves of the track to be contracted.

While particular embodiments of the present invention have been illustrated and described herein, the scope of this patent is not limited to the particular illustrated embodiments. The scope of the patent shall be defined by the following claims and equivalents thereto.

What is claimed is:

1. An adjustable conveyor for conveying articles, the adjustable conveyor comprising:

a frame;

a first track including a first conveyor belt;

a second track including a second conveyor belt;

the first track and the second track being mounted on the frame so that the first track and the second track are parallel to each other;

each of the first track and the second track includes a first element and a second element that are slidably connected to each other so that a space between the first element and the second element is adjustable so as to change a length of the respective track; and each of the first and second tracks includes a plurality of guides that are slidably mounted on the respective track in an overlapping manner so that an amount of overlap between the guides is adjusted as the space between the first element and the second element is adjusted.

2. The adjustable conveyor of claim 1, wherein the guides are slide blocks that are slidably mounted on the first element of each track.

3. The adjustable conveyor of claim 1, wherein each of the first conveyor belt and the second conveyor belt are supported by both the first element and the second element of the respective first and second track.

4. The adjustable conveyor of claim 2, wherein the first element and the second element are slidable along an axial direction of the first element and the second element.

5. The adjustable conveyor of claim 2, wherein each of the first and second tracks comprises means for maintaining a uniform tension on the respective conveyor belt when the length of the track is changed.

6. The adjustable conveyor of claim 2, wherein each of the slide blocks includes a first overlap element and a second overlap element, and wherein the first overlap element of one of the slide blocks engages with the second overlap element of an adjacent one of the slide blocks to limit relative movement between the one of the slide blocks and the adjacent one of the slide blocks.

7. The adjustable conveyor of claim 6, wherein the first overlap element is an upwardly facing edge and the second overlap element is a downwardly facing edge.

8. The adjustable conveyor of claim 6, wherein each of the slide blocks includes a first overlap flat surface adjacent the first overlap element and a second overlap flat surface adjacent the second overlap element.

9. The adjustable conveyor of claim 7, wherein each of the slide blocks includes a first overlap flat surface adjacent the first overlap element and a second overlap flat surface adjacent the second overlap element.

10. The adjustable conveyor of claim 2, wherein each of the plurality of slide blocks includes a slot for receiving the respective conveyor belt.

11. The adjustable conveyor of claim 2, wherein the articles are flat objects.

12. The adjustable conveyor of claim 2, wherein the articles are printed circuit boards.

13. The adjustable conveyor of claim 2, further comprising:

a drive shaft extending perpendicular to the first track and the second track;

a motor for driving the drive shaft;

a first drive pulley on the first track for driving the first conveyor belt;

a second drive pulley on the second track for driving the second conveyor belt;

means for engaging the drive shaft to the first drive pulley; and means for engaging the drive shaft to the second drive pulley.

14. The adjustable conveyor of claim 2, further comprising means for simultaneously driving the first and second conveyor belts.

15. An adjustable conveyor belt assembly used for conveying printed circuit boards, the adjustable conveyor belt assembly comprising:

a conveyor belt;

means for supporting the conveyor belt, the supporting means including a first element and a second element that are slidably connected to each other so that a space between the first element and the second element is adjustable so as to change a length of the adjustable conveyor belt assembly; and guide means mounted on the supporting means for guiding the conveyor belt along the supporting means, the guide means including a plurality of slide blocks that are slidably mounted on the supporting means in an overlapping manner so that an amount of overlap between the slide blocks is adjusted as the length of the adjustable conveyor belt assembly is changed.

16. The adjustable conveyor belt assembly of claim 15, wherein each of the slide blocks includes a slot for receiving the conveyor belt.

17. The adjustable conveyor belt assembly of claim 16, wherein each of the slide blocks further includes means for guiding the printed circuit boards.

18. The adjustable conveyor belt assembly of claim 16, wherein the guide means includes a fixed element mounted on the supporting means in alignment with the plurality of slide blocks.

19. The adjustable conveyor belt assembly of claim 18, wherein the fixed element includes a slot that is aligned with the slots in the slide blocks.

20. The adjustable conveyor belt assembly of claim 15, further comprising means for maintaining a uniform tension on the conveyor belt when the length of the adjustable conveyor belt assembly changes.

21. The adjustable conveyor belt assembly of claim 15, wherein each of the slide blocks includes a first overlap element and a second overlap element, and wherein the first overlap element of one of the slide blocks engages with the second overlap element of an adjacent one of the slide blocks to limit relative movement between the one of the slide blocks and the adjacent one of the slide blocks.

22. The adjustable conveyor belt assembly of claim 21 wherein the first overlap element is an upwardly facing edge and the second overlap element is a downwardly facing edge.

23. The adjustable conveyor belt assembly of claim 22, wherein each of the slide blocks includes a first overlap flat surface adjacent the first overlap element and a second overlap flat surface adjacent the second overlap element.

24. The adjustable conveyor belt assembly of claim 21, wherein each of the slide blocks includes a first overlap flat surface adjacent the first overlap element and a second overlap flat surface adjacent the second overlap element.

* * * * *